Sept. 8, 1942.                B. JACOBY                2,295,344
                             FRICTION CLUTCH
               Filed March 10, 1941            2 Sheets-Sheet 1
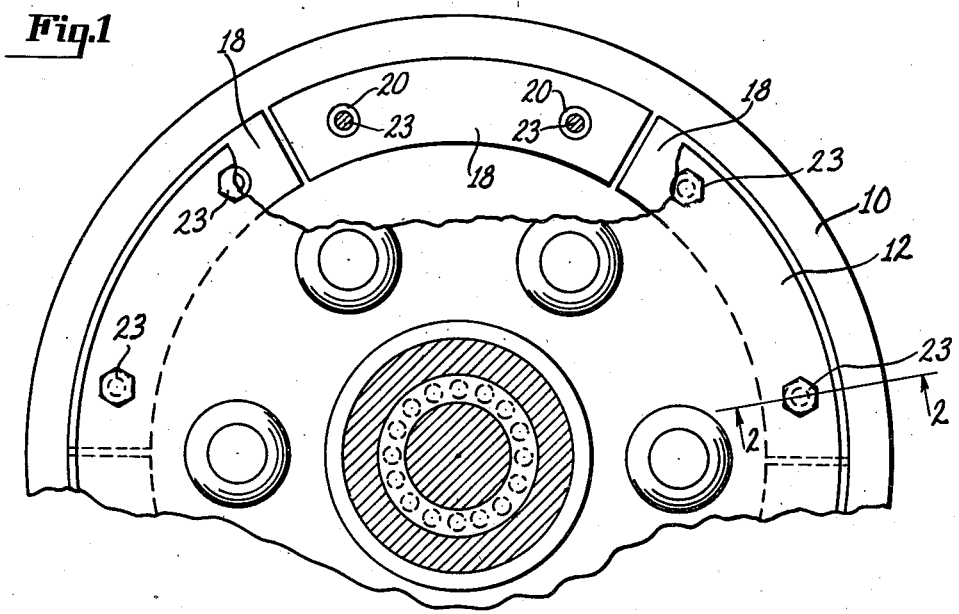
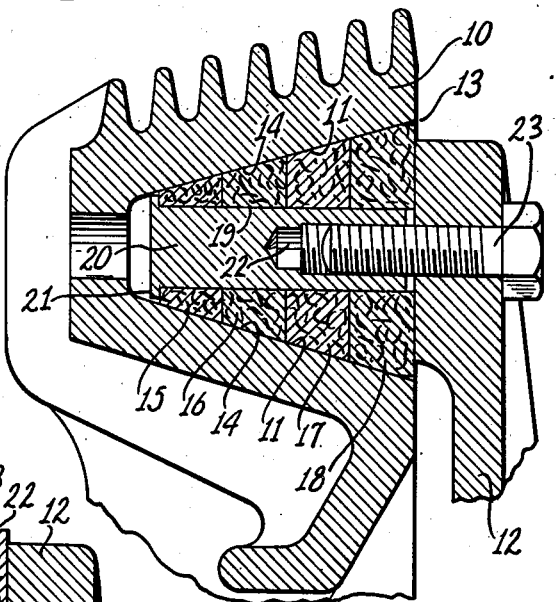
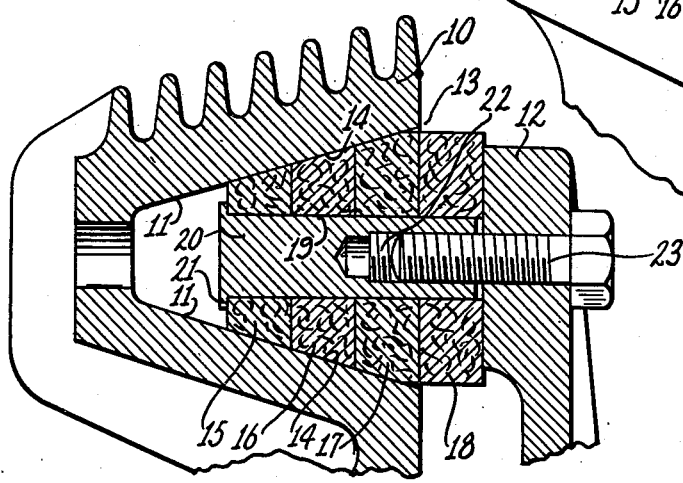
INVENTOR
BENJAMIN JACOBY
BY
ATTORNEY

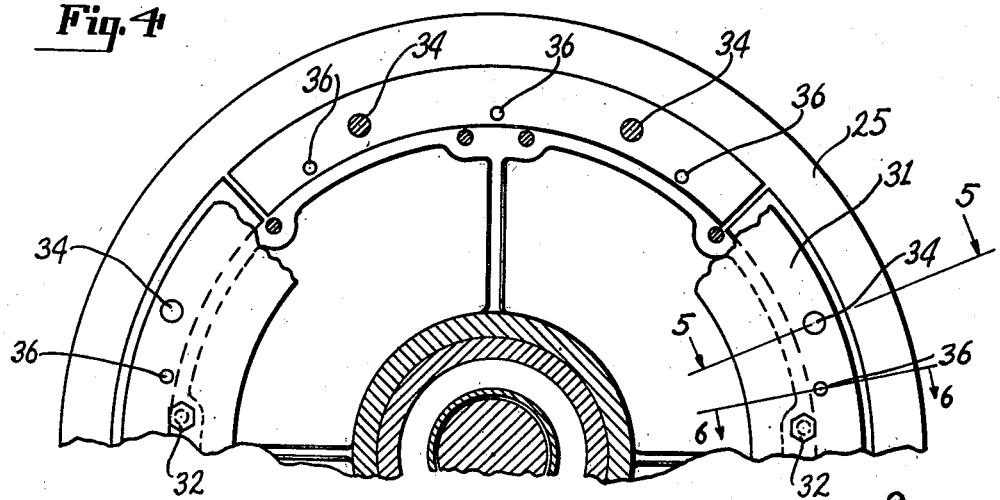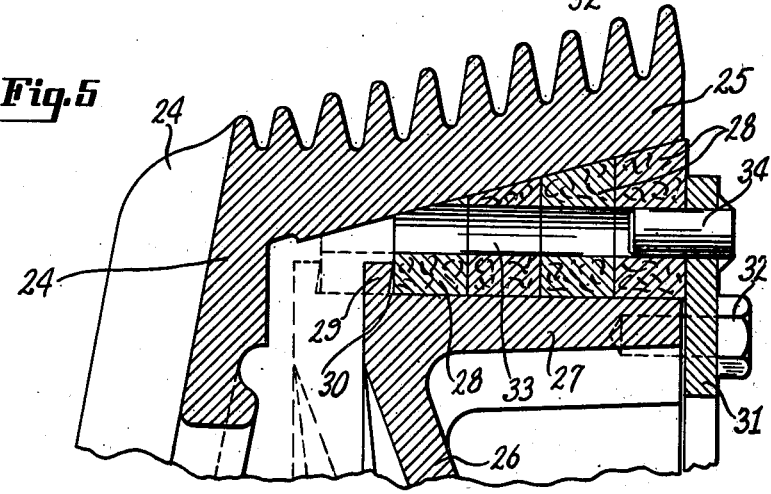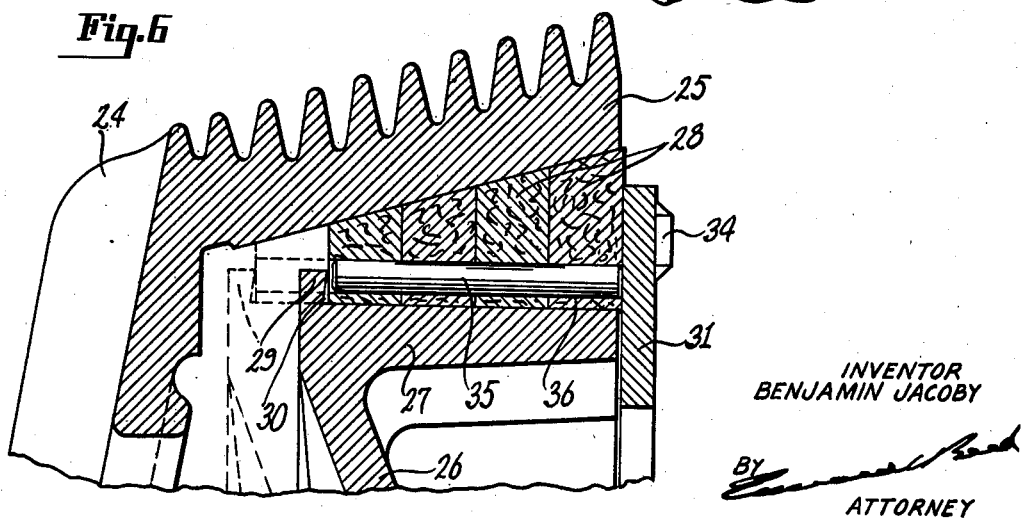

Patented Sept. 8, 1942

2,295,344

UNITED STATES PATENT OFFICE 2,295,344

FRICTION CLUTCH

Benjamin Jacoby, Marion, Ohio, assignor to The Marion Steam Shovel Company, Marion, Ohio, a corporation of Ohio Application March 10, 1941, Serial No. 382,481

16 Claims. (Cl. 192—66)

This invention relates to friction clutches and the like and more particularly to that type of clutch in which the clutch members are provided with opposed inclined contact surfaces arranged to be brought into wedging engagement by the axial movement of one of the clutch members.

In clutches of this type it is customary to provide one of the clutch members with a contact or friction surface, usually of metal, which is inclined toward the axis of rotation, and to provide the other clutch member with a correspondingly shaped friction element detachably secured thereto. This friction element is subjected to severe wear and is eventually so reduced in width that it can no longer be brought into driving engagement with the friction surface of the other clutch member, and it is then necessary to remove and replace it with a new friction element. When a one piece friction element is thus worn out only a very small part of the friction material has been worn away and the major portion of the element is discarded as it is no longer useful. Friction material of the kind used in this friction element is very expensive and the discarding of so large a part of the friction element involves a very substantial loss.

One object of the invention is to materially reduce this loss by providing a friction element of such a character that a relatively large portion of the friction material may be utilized in service.

A further object of the invention is to provide a friction element of such a construction that when worn away to such an extent that it no longer operates satisfactorily, a portion of the smaller side of the tapered element may be removed and new material added to the wider side thereof, thus restoring the friction element substantially to its original dimensions and wasting only a small quantity of material.

A further object of the invention is to so construct the friction element and so connect the same with the clutch member that the removal of the small worn portion and the addition of the new material can be quickly and easily effected at small expense.

A further object of the invention is to provide a sectional friction element with simple and efficient means for connecting the sections thereof one with the other and with the clutch member of which it forms a part.

Other objects of the invention may appear as the device is described in detail.

In the accompanying drawings Fig. 1 is a front elevation, partly broken away, of a clutch equipped with my invention; Fig. 2 is a section taken on the line 2—2 of Fig. 1, through the cooperating parts of the two clutch members and showing the friction element in the position which it occupies when new; Fig. 3 is a similar section showing a friction element at approximately the limit of its inward movement with relation to the friction surface of the cooperating clutch member; Fig. 4 is a front elevation, partly broken away, of a clutch equipped with a modified form of the invention; Fig. 5 is a section taken on the line 5—5 of Fig. 4; and Fig. 6 is a section taken on the line 6—6 of Fig. 4.

In these drawings I have shown two embodiments of the invention to illustrate its application to clutch members of different constructions but it will be understood that the invention may take various forms and may be applied to clutches, brakes and the like of various kinds. The term "clutch" as herein used is intended to include all such devices to which the invention is applicable.

In that embodiment of the invention illustrated in Figs. 1, 2 and 3, the clutch comprises a driving member 10 having an annular substantially V-shaped groove the walls of which converge to provide the driving member with contact surfaces 11 inclined in opposite directions with relation to its axis of rotation, and a driven member including a supporting element 12 and a friction element 13 secured thereto. While the clutch member which carries the friction element is herein referred to as the driven member it will be obvious that the friction element may be carried by either the driving member or the driven member, and that either member may have axial movement toward the other member to effect the clutching operation.

The friction element 13 comprising a plurality of separate sections arranged in planes intersecting the axis of rotation of the clutch and preferably having abutting contact one with the other. These sections decrease in width progressively toward the inner edge of the friction element, that is, toward the apex of the V-shaped groove in the driving member, and the contact surfaces of each section are inclined to provide the friction element as a whole with converging contact surfaces 14 which are adapted to have driving frictional engagement with the corresponding contact surfaces of the driving member. There may be any suitable number of such sections. In the present instance I have shown four, indicated at 15, 16, 17 and 18. When the friction element is first installed the inclined surfaces thereof are of a length less than the axial thickness of the friction element as a whole so that, as the friction surfaces wear away, the friction element may be inserted further and further into the groove or channel of the driving member to maintain proper frictional contact with the friction surfaces of the latter. As shown in Fig. 2 the contact surfaces of sections 15 and 16 are fully inclined, the contact surface of section 17 is partly inclined and the surface of section 18 has no inclination. As the friction element enters further and further into the groove of the driving member the contact surfaces of sections 17 and 18 will be worn down to an inclined shape, as shown in Fig. 3, in which figure the friction element is shown in approximately its innermost or worn-out position, as the further movement of the driving member toward the friction element would result in metal to metal contact between the clutch members. When the friction element is thus worn-out it is withdrawn from the driving member, the innermost small width section 15 is removed and a new section of full width is applied to the outer surface of the section 18. When this has been done the section 16 becomes the innermost section and occupies the position occupied by the section 15 in Fig. 2, and the added section occupies the position occupied by the section 18 of Fig. 2. In this manner the friction element is restored to substantially its original size and shape so as to constitute in effect a new friction element, the useful life of which will be as great as the useful life of the original friction element, and this is accomplished by discarding only the relatively small inner section. When the restored friction element has in like manner been worn-out the inner section is removed and a new section added in the same manner. Consequently each section of the friction element is worn down to approximately the width shown at 15 in Fig. 3 before being discarded and therefore a very large part of the material of the friction element as a whole is utilized in service. The term "worn-out" is herein used to designate that condition of the friction element which makes necessary or desirable the removal of the inner section and the addition of a new outer section. This necessity may result from various causes but is usually due to the friction element wearing away to such an extent as to permit metal to metal contact between the clutch members, which may either positively limit the relative axial movement thereof or cause injury to or wear on the metal parts.

The friction element may take various forms and in large clutches it is preferably in the form of a segment or block, as shown in Fig. 1, a plurality of these segments being arranged in circumferential alinement to provide the clutch member with substantially continuous friction surfaces, the segments being separated slightly to permit the expansion thereof due to the heating of the clutch. It will be understood, however, that the friction element may be annular in form or of any other shape suitable for its intended use.

The several sections of the friction element may be connected one with the other and with the supporting element 12 of the driven member in any suitable manner. In the arrangement shown in Figs. 1, 2 and 3, the several sections are provided with alined openings 19 to receive a connecting member or pin 20 which serves to hold the sections against relative lateral displacement and also provides means whereby the several sections may be secured to the supporting element and clamped one against the other. As here shown, the connecting pin is provided near its inner end with a part forming a stop, such as a flange 21 which abuts against the inner surface of the inner section 15. At its outer end the connecting pin is provided with means whereby it may be attached to the supporting element and drawn toward that element to cause the sections to be clamped between the stop 21 and the supporting element. Preferably the outer end portion of the connecting pin is provided with a screw threaded socket 22 to receive a screw threaded member or screw 23 mounted in the supporting element 12 and threaded into the socket 22, and the connecting pin is of such length that the outer end thereof will terminate within the opening in the outer section 18, thereby permitting the screw to draw the connecting pin toward the supporting element to clamp the several sections one against the other and against the supporting element and to establish driving connection between the friction element and the supporting element. There may be any suitable number of openings 19 and connecting pins and with segments of the length here shown I prefer to use two series of openings and two connecting pins, as shown in Fig. 1.

When the friction element is so worn that it is necessary to renew the same it is withdrawn from the driving member and the screws 23 removed, thus disconnecting the friction element from the supporting element. The inner section may be removed by withdrawing the connecting pins but usually this can be more easily accomplished by breaking the inner element, by a hammer or cold chisel, thus avoiding the removal of the pins and permitting the latter to retain the other sections in proper relation one to the other. The connecting pins are then moved to bring the flanges 21 thereof into engagement with the smallest of the remaining sections, that is, the section 16, this movement causing the outer ends of the pins to project beyond the outer section 18. The new section is then placed over these pins and the renewed friction element again attached to the supporting element by the screws 23. The operation is of such a character that it can be quickly accomplished with a minimum of labor and expense.

In Figs. 4, 5 and 6, the invention is shown as applied to a clutch the driving member 24 of which is provided with a single friction surface formed on a circumferential flange 25. The supporting element 26 of the driven member extends within this circumferential flange and is provided with a supporting surface formed on a flange 27. The friction element is supported on the flange 27 and comprises a series of sections 28 of progressively decreasing width and having inclined contact surfaces to provide the friction element as a whole with an inclined contact surface adapted to cooperate with the contact surface of the driving member. The sections of the friction element are similar to those above described except that they are provided with friction surfaces on one edge only, and when worn the sections are removed and replaced in the manner above described. The several sections may be connected one with the other and with the supporting element in any suitable manner. In the arrangement shown the supporting flange 27 is provided near its inner edge with a stop, such as an abutment 29, which the innermost section 28 abuts, this flange being preferably undercut as shown at 30 so that the edge thereof will bite into the section. The supporting element includes an annular member or flat ring 31 which is connected with the flanged portion 27 of the supporting element by screws 32 and which overlaps the outer surface of the outer section 28. The flange 27 is of such width with relation to the combined thickness of the several sections that the annular member 31 may be moved axially with relation to the flange 27 by the screws 32 to clamp the several sections between the same and the abutment 29. The driving connection may be established between the supporting element and the friction element in any suitable manner. In the present instance the several sections of the friction element are provided with alined openings 33 into which extends a connecting member or driving pin 34 rigidly secured to the annular member 31. The arrangement of the openings 33 is such that the inclined contact surface of the friction element cuts through the openings in one or more of the inner sections 28 and therefore the driving pin 34 is of such length that it will at no time engage the friction surface of the driving member. In the present instance this driving pin is of a length slightly less than the thickness of one of the sections.

To prevent the lateral displacement of the several sections they are further connected one to the other by a connecting pin 35 which extends through alined openings 36 in the several sections, these openings being preferably arranged at such a distance from the inclined surface of the friction element that the pin 35 will at no time contact with the friction surface of the driving member, and, further, the pin is of such length that it will not interfere with the clamping of the sections between the abutment 29 and the annular member 31. In this form of the device also the worn section may be removed and a new section added with but little labor and expense. The annular retaining member 31 is removed thereby withdrawing the driving pin from the friction element and the innermost section of the friction element is removed from the supporting flange, as by slipping the same off the pins 35, and the remaining sections are moved inwardly to bring the innermost one thereof into contact with the abutment 29, a new section is mounted on the flange 27 at the outer side of the friction element and the retaining member 31 again connected with the supporting element to clamp the sections between the same and the abutment. It will be understood that the number of driving pins 34 and of connecting pin 36 will depend more or less upon the length of the segments and, in the present instance, I have shown two driving pins 34 and three series of openings to receive connecting pins.

It will be noted that in the form of the invention shown in Figs. 1 to 3 the outer section 18 of the friction element when new, either original or replacement, lies entirely outside of the driving element, while in the form shown in Figs. 4 to 6 the outer section 28 of the friction element lies within the driving member. The arrangement shown in Figs. 1 to 3 is preferable and can be, and in practice probably will be, applied to both forms of the friction element whenever the construction of the machine on which the clutch is installed is such as to provide the necessary clearance. With the arrangement shown in Figs. 4 to 6 the friction element as a whole must be machined or otherwise formed to provide all the sections thereof with inclined surfaces corresponding accurately to the inclined surface of the driving member, and when a replacement section is added the circumferential surface of that section must be shaped to accurately correspond to the contact surface of the driving member. Should any part of the circumferential surface of the outer section project radially beyond the outer edge of the driving member the contact of the section with the outer edge of the driving member will result in the formation of a shoulder on the contact surface of the outer section as the friction element as a whole wears away. Such a shoulder would interfere with the proper engagement of the contact surfaces and would necessarily have to be removed. Further, a replacement section would have to be accurately shaped so as to properly fit within the driving member. It will also be noted that as the friction element wears away the outer section moves inwardly beyond the outer edge of the driving member and this results in an uneven wear on the contact surface of the driving member. In the form shown in Figs. 1 to 3 the friction element, as originally formed, is tapered for a portion of its length only and the outer section has its circumferential contact surface substantially parallel with the axis of the friction element and this surface is described on a radius of a length not greater than, and preferably slightly less than, the radius of the outer edge of the contact surface of the driving member. When the tapered surface is in contact with the driving member the outer section will lie outside of, or will only slightly enter, the driving member and as the friction element wears away the parallel contact surface of the outer section will be gradually converted into an inclined contact surface, as above described, and as shown in Fig. 3. This arrangement eliminates the possibility of a shoulder being formed on the outer section, avoids the uneven wear on the outer portion of the driving member and also avoids the necessity for extreme accuracy in producing the outer section. Consequently this section can be quickly and easily formed, at a low cost, by a cutting or molding operation, with full assurance that it will function properly when attached to the friction element.

In either form of the friction element the thickness of each section thereof and therefore the number of sections, should be determined in accordance with the relative axial movement of the clutch members. It is important that each section shall be sufficiently thin to permit the inner section to be worn away to the greatest extent which is feasible and at the same time thick enough to avoid frequent replacements. It is also important that each section shall be of such thickness that when the friction element reaches its innermost or worn-out position the outer section thereof shall be so located with relation to the cooperating contact surface, in the present instance on the driving member, that the inner face of a new section may contact with the outer face thereof and when in such contact the new section will be supported in proper relation to the inclined surface of the friction element. In that embodiment shown in Figs. 2 and 3 it is preferable that the outer face of said outer section be substantially in the plane of the adjacent edge of said cooperating contact surface. If the outer section is located inwardly any substantial distance beyond the edge of the cooperating contact surface a new section cannot be moved inwardly far enough to engage the same. If the old sections are moved outwardly into engagement with the new section they will also be moved out of engagement with the cooperating contact surface and only the inner corner of the new section will engage that surface, so that the friction element will not have driving engagement with the cooperating surface until that corner has been worn away. If the outer section projects outwardly a substantial distance beyond the cooperating contact surface, when the inner section is removed, the new section will be spaced an undesirable distance from that surface and the effective contact surface of the renewed friction element will be materially reduced. In the embodiment shown in Figs. 5 and 6 the cooperating contact surface, of the driving member, is of such width that a new, or renewed, friction element, substantially as a whole, may be positioned within and have operative engagement with said contact surface, and the new section is preformed to fit within the outer edge portion of said contact surface. The preformed inclined peripheral surface of the new section definitely limits its inward movement and consequently the outer section of the worn-out friction element must be so located that the new section may have contact therewith. In other words, when the inner section is worn away to such an extent that it must be removed the outer section must be worn away to such an extent that its outer face will be of a radial width equal to the radial width of the inner face of a new section. The desired results are best achieved by making each section of a thickness substantially equal to the relative axial movement of the two clutch members required to wear the friction element to a "worn-out" condition, that is, the distance between the position of the inner edge of a new friction element, when it first engages the cooperating contact surface, and the innermost position of that edge when said friction element is worn-out. In the illustrated forms of the friction element that distance is equal to one-fourth of the axial width of the friction element.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a rotary friction clutch, cooperating clutch members one of which is axially movable toward and from the other, one of said members having an inclined contact surface and the other of said members including a supporting element having a peripheral surface provided at its inner side with a shoulder, a friction element supported on said peripheral surface and comprising a plurality of separate sections of progressively decreasing width toward the inner edge thereof, the inner section engaging said shoulder, said friction element having a plurality of openings extending through the several sections, an elongate member extending through one of said openings to hold said sections against lateral displacement, a retaining member supported at the outer side of said supporting element for axial movement with relation thereto and overlapping the outer section of said friction element, a driving pin carried by said retaining member and extending into another of said openings, and means for securing said retaining member to said supporting element and for imparting axial movement thereto.

2. In a rotary friction clutch, two clutch members one of which has an inclined contact surface and the other of which includes a supporting element and a friction element, said friction element having an inclined contact surface to cooperate with the first mentioned contact surface and comprising a plurality of separate sections of progressively decreasing width toward the inner edge of said friction element, one of said clutch members being movable axially toward the other clutch member to operatively engage said contact surfaces one with the other, the extent of said axial movement increasing as said friction element wears away, each section of said friction element being of a thickness approximately equal to the axial distance between the position occupied by the inner edge of said friction element when the latter first engages said cooperating contact surface and the innermost position occupied by said inner edge when said friction element is worn-out, and means for rigidly and detachably connecting said sections one with the other and with said supporting element, whereby when said friction element is worn-out the inner section may be removed, the remaining sections moved inwardly with relation to said supporting element, and a new section of maximum width attached to the outer side of said friction element.

3. In a rotary friction clutch, two clutch members one of which has an inclined contact surface and the other of which includes a supporting element and a friction element, said friction element having an inclined contact surface to cooperate with the first mentioned contact surface and comprising a plurality of separate sections of progressively decreasing width toward the inner edge of said friction element, one of said clutch members being movable axially toward the other clutch member to operatively engage said contact surfaces one with the other, the extent of said axial movement increasing as said friction element wears away, each section of said friction element being of a thickness approximately equal to the axial distance between the position occupied by the inner edge of said friction element when the latter first engages said cooperating contact surface and the innermost position occupied by said inner edge when said friction element is worn-out, and means carried by said supporting element for rigidly and detachably connecting said sections one with the other and with said supporting element, said means including a part parallel with the axis of rotation of said clutch members to support said sections and on which each section may be supported successively in different axial positions, thereby permitting the inner section to be removed, the remaining sections moved inwardly and a new section attached to the outer end of said friction element.

4. In a rotary friction clutch, two clutch members one of which has an inclined contact surface and the other of which includes a supporting element and a friction element, said friction element having an inclined contact surface to cooperate with the first mentioned contact surface and comprising a plurality of separate sections of progressively decreasing width toward the inner edge of said friction element, one of said clutch members being movable axially toward the other clutch member to operatively engage said contact surfaces one with the other, the extent of said axial movement increasing as said friction element wears away, each section of said friction element being of such thickness that when a new friction element first engages the cooperating contact surface the inner face of the outer section will be substantially in the plane of the adjacent edge of said cooperating contact surface and when said friction element is in its worn-out position the outer face of said outer section will be substantially in said plane, and means for rigidly and detachably connecting said sections one with the other and with said supporting element.

5. In a rotary friction clutch, two clutch members one of which has an inclined contact surface and the other of which includes a supporting element and a friction element, said friction element having an inclined contact surface to cooperate with the first mentioned contact surface and comprising a plurality of separate sections of progressively decreasing width toward the inner edge of said friction element, one of said clutch members being movable axially toward the other clutch member to operatively engage said contact surfaces one with the other, the extent of said axial movement increasing as said friction element wears away, each section of said friction element being of such thickness that when said friction element is in its worn-out position with relation to the cooperating contact surface the outer section thereof will be so located with relation to the outer edge of said contact surface that a new section may be placed in contact therewith and supported in operative relation to the contact surface of said friction element, and means for rigidly and detachably connecting said sections one with the other and with said supporting element.

6. In a rotary friction clutch, cooperating clutch members one of which is axially movable toward and from the other, one of said members having an inclined contact surface and the other member including a supporting element and a friction element, said friction element having an inclined contact surface cooperating with the first mentioned contact surface and comprising a plurality of separate sections of substantially rigid material, said sections progressively decreasing in width toward the inner edge of said friction element, each section being of a thickness equal to a substantial portion of the axial width of said friction element and being adjustable axially with relation to said supporting element, said supporting element having means for supporting each section in operative engagement with said cooperating contact surface in each adjusted position of said section and for rigidly and detachably connecting said sections one with the other and with said supporting element.

7. In a rotary friction clutch, cooperating clutch members one of which is movable axially toward and from the other, one of said members having an inclined contact surface and the other member including a supporting element and a friction element, said friction element having an inclined contact surface to cooperate with the first mentioned contact surface and comprising a plurality of separate relatively thick and substantially rigid sections of progressively decreasing width toward the inner edge thereof and provided with alined openings, means for detachably connecting said sections one with the other and with said supporting element including a member carried by said supporting element, extending through said alined openings and constituting the sole support for said sections, each section being adjustable lengthwise of the last mentioned member to different operative positions with relation to said first mentioned contact surface.

8. A friction element for a clutch of the type comprising two clutch members one of which has an inclined contact surface and the other of which includes a supporting element and a friction element having an inclined contact surface to cooperate with the first mentioned contact surface, said friction element comprising a plurality of substantially rigid sections which decrease in width progressively toward the inner edge of said friction element, each section being of a thickness substantially equal to the axial travel required to wear a new friction element to a worn-out condition, and each section having a part to cooperate with said supporting element to support said section in operative relation to said first mentioned contact surface when said section is in any one of a plurality of positions spaced apart axially of said supporting element.

9. A friction element for a rotary clutch one member of which is axially movable into and out of driving engagement with the other member, said friction element comprising a plurality of substantially rigid arcuate sections arranged face to face and decreasing in width progressively toward the inner edge of said friction element, said sections being separable one from the other and having supporting surfaces in a line substantially parallel with the axis of rotation of said friction element, and each section being of a thickness substantially equal to the axial travel of said axially movable member between the positions of engagement of said members when said friction element is new and when the innermost section thereof is substantially worn out.

10. A section for a tapered friction element which comprises a plurality of sections and is adapted to form a part of one member of a rotary clutch, one member of which is axially movable into and out of driving engagement with the other member thereof, said section being of a thickness substantially equal to the axial travel of the axially movable member of said clutch between the positions of engagement of said clutch members when said friction element is new and when the innermost section thereof is substantially worn out, said section having a supporting surface substantially parallel with its axis of rotation.

11. A section for a tapered friction element which comprises a plurality of sections and is adapted to form a part of one member of a rotary clutch, one member of which is axially movable into and out of driving engagement with the other member thereof, said section being of a thickness substantially equal to the axial travel of the axially movable member of said clutch between the positions of engagement of said clutch members when said friction element is new and when the innermost section thereof is substantially worn out, and being of a radial width corresponding substantially to the radial width of the outer section of said friction element when the innermost section thereof is substantially worn out, said section also having means whereby it may be detachably connected with the other sections of said friction element in predetermined relation thereto, and having a supporting surface substantially parallel with its axis of rotation.

12. In a rotary friction clutch, cooperating clutch members one of which is axially movable toward and from the other, one of said members having an inclined contact surface and the other member including a supporting element and a friction element, said friction element having an inclined contact surface cooperating with the first mentioned contact surface and comprising a plurality of separate sections of substantially rigid material, said sections progressively decreasing in width toward the inner edge of said friction element, each section being of a thickness equal to a substantial portion of the axial width of said friction element and being adjustable axially with relation to said supporting element, said supporting element having means for supporting each section in operative engagement with said cooperating contact surface in each adjusted position of said section, said sections having alined openings, an elongate member extending through said openings, relatively movable parts carried by said supporting element and engaging respectively the inner and outer sections, and means for moving one of said parts toward the other part to clamp said sections one against the other and for rigidly and detachably connecting the same with said supporting element, whereby said friction element as a whole may be removed from said supporting element, an inner section removed therefrom and a new outer section added thereto while the other sections are retained in their proper positions by said elongate member.

13. In a rotary friction clutch, cooperating clutch members one of which is axially movable toward and from the other, one of said members having an inclined contact surface and the other member including a supporting element and a friction element, said friction element having an inclined contact surface cooperating with the first mentioned contact surface and comprising a plurality of separate segments, each segment comprising a plurality of separate sections which decrease progressively in width toward the inner edge of said segment, each section being of a thickness equal to a substantial portion of the axial width of said segment and being axially adjustable with relation to said supporting element, the sections of each segment having alined openings, said supporting element having parts overlapping the openings in the outermost sections of the several segments, elongate members extending through the alined openings in the sections of the respective segments and having at their inner ends shoulders engaging the respective inner sections and having in their outer ends screw threaded sockets, and screw threaded members extending through said parts of said supporting element into the respective sockets to clamp the sections one against the other and against said supporting element and to rigidly secure said segments to said supporting element.

14. In a rotary friction clutch, cooperating clutch members one of which is axially movable toward and from the other, one of said members having an inclined contact surface and the other member including a supporting element and a friction element, said friction element having an inclined contact surface cooperating with the first mentioned contact surface and comprising a plurality of separate segments, each segment comprising a plurality of separate sections which decrease progressively in width toward the inner edeg of said segment, each section being of a thickness equal to a substantial portion of the axial width of said segment and being axially adjustable with relation to said supporting element, said supporting element having a surface parallel with its axis of rotation on which said sections are supported and having at one end of said surface a shoulder engaging the inner sections of said segments, an annular member engaging the outer sections of said segments, means for securing said annular member to said supporting element and drawing the same toward the latter to clamp said sections between said annular member and said shoulder, the sections of each segment having two series of alined openings, an elongate member extending through the openings of one series, and a part carried by said annular member and extending into the outer opening of the other series to drivingly connect said annular member with said segment.

15. In a rotary friction clutch, cooperating clutch members one of which is axially movable toward and from the other, one of said members having converging contact surfaces and the other of said members including a supporting element and a friction element, said friction element having converging contact surfaces to cooperate with the respective first mentioned contact surfaces and comprising a plurality of separate sections of substantially rigid material, said sections progressively decreasing in width toward the inner edge of said friction element and having alined openings, each section being of a thickness equal to a substantial portion of the axial width of said friction element and being adjustable axially with relation to said supporting element, said supporting element comprising a body portion and a part spaced from the axis thereof, extending through said alined openings in supporting engagement with said sections and having its supporting surface substantially parallel with said axis to support each section in different operative positions with relation to the contact surface of the first mentioned clutch member, said part having a laterally extending portion to engage the inner face of the innermost section, and means for moving said part toward said body portion to rigidly connect said sections one with the other and for detachably connecting said part with said body portion.

16. In a rotary friction clutch, cooperating clutch members one of which is axially movable toward and from the other, one of said members having a single annular contact surface inclined with relation to its axis of rotation, the other of said members including a supporting element and a friction element, said supporting element having a peripheral supporting surface spaced radially from the contact surface of the first mentioned member and substantially parallel with said axis, said friction element having an inclined contact surface cooperating with the first mentioned contact surface and comprising a plurality of separate arcuate sections of substantially rigid friction material supporting on said peripheral surface of said supporting element and movable axially thereon, each section being of a thickness equal to a substantial portion of the axial width of said friction element, said sections decreasing in width and progressively toward the inner edges of said friction element, means for rigidly connecting said sections one with the other and with said supporting element, and means to prevent the relative circumferential or radial displacement of said sections when they have been disconnected from said supporting element.

BENJAMIN JACOBY.